United States Patent [19]
Niwata et al.

[11] 4,085,422
[45] Apr. 18, 1978

[54] FEE-CHARGING APPARATUS FOR TELEVISION SETS

[75] Inventors: Tatuji Niwata, Kawakita; Kazutomo Okubo, Kanazawa; Fumio Nakanishi, Matsuto; Masanori Yamada, Kanazawa, all of Japan

[73] Assignee: Hokuryo Denko Co., Ltd., Japan

[21] Appl. No.: 701,106

[22] Filed: Jun. 30, 1976

Related U.S. Application Data

[63] Continuation-in-part of Ser. No. 513,631, Oct. 10, 1974, abandoned.

[30] Foreign Application Priority Data

Oct. 31, 1973 Japan .................................. 48-126191
Nov. 27, 1973 Japan .................................. 48-137042

[51] Int. Cl.$^2$ ............................................. H04N 1/44
[52] U.S. Cl. ...................................... 358/118; 358/115
[58] Field of Search ................ 358/114, 118, 120, 115; 325/308

[56] References Cited

U.S. PATENT DOCUMENTS

| 3,202,758 | 8/1965 | Brownstein | 358/118 |
| 3,347,982 | 10/1967 | Bass et al. | 358/118 |
| 3,684,823 | 8/1972 | McVoy | 358/118 |
| 3,760,097 | 9/1973 | Burroughs | 358/118 |
| 3,899,633 | 8/1975 | Sorenson | 358/118 |

Primary Examiner—S. C. Buczinski

[57] ABSTRACT

An apparatus with specified video carrier jamming for disturbing the image on a screen of a TV receiver for Fee-charged Viewing Thereof comprises an oscillating circuit, a switch means, a feeding device and a mixer circuit, and the said mixer circuit combines a video carrier with the output of said oscillating circuit.

7 Claims, 7 Drawing Figures

FEE-CHARGING APPARATUS FOR TELEVISION SETS

This application is a continuation-in-part application of our U.S. patent application Ser. No. 513,631, filed Oct. 10, 1974, now abandoned.

The present invention relates to a video security system for pay-TV.

It relates further to an apparatus with specified video carrier jamming for disturbing image on screen of a TV receiver for fee-charged viewing thereof.

The prior arts of the subject system or apparatus are, for example, as follows.

Firstly, U.S. Pat. No. 3,684,823, shows the use of a locally produced jamming signal mixed at each subscription receiver which can either be switched in or out depending on whether the subscriber has qualified for reception.

Further, U.S. Pat. No. 3,202,758 shows the use of a spoiling transmitter designed to transmit at substantially the frequency of one TV channel and which may be switched in or out at a subscriber's station prior to passing to the TV receiver antenna input terminal by control of a coin operated switch.

Further, U.S. Pat. No. 3,347,982 shows the use of a notch filter either switched in or by-passed according to control of a coin operated switch prior to passing to a subscriber's TV receiver antenna terminal.

Furthermore, as disclosed on p.p. 42 to 54 of IEEE'64-5BTR VOL. 10 No. 1, an example of pay-TV system is a "video security system" which has been already put into practice in U.S.A., and the typical one of which is a system manufactured by Teleglobe. According to this system, the transmitting station transmits encoded TV signals which fail in producing stable and clear image when received by an ordinary TV receiver, while a subscriber views TV by decoding the said signal into TV signals permitting to produce stable and clear images by means of a decoding apparatus interposed between a TV antenna and a TV receiver.

On the other hand, recently, in hotels, information bureaus, amusement houses or the like, an idle channel (e.g. Channel II in a certain district where Channels I, III, IV, VI, VIII, X and XII are employed for transmitting TV signals from TV transmitting stations with Channel II, V, VII, IX and XI being idle) is used for transmitting TV signal by means of a VTR or the like, thereby to provide private TV program service. And accordingly, a demand has been increased for adapting only a specified channel or channels of those of a TV receiver to be for pay-viewing. By realizing this, it becomes possible that a channel for private TV programs (e.g. Channel II) permits pay-viewing while channels in which TV signals are transmitted from TV transmitting stations (e.g. Channels I, III, IV, VI, VIII, X and XII) are for viewing free of charge.

For this demand, the systems according to the above-mentioned U.S. patents and described in the abovementioned document are such that an encoder is installed on the side of the transmitting station with a decoder on the side of a receiver, and especially the encoder requires complicated equipments, thus being very expensive.

Further, an "image security system" now in use in U.S.A. may be employed, but it also requires extremely expensive equipments and complicated control systems. Therefore, it is substantially impossible to introduce such a system into hotels information bureaus or the like. To meet such a demand, the inventors have succeeded obtaining an apparatus according to the present invention after an extensive study.

Accordingly, objects and advantages of the present invention are as follows.

(1) An apparatus according to the present invention is intended to be additionally arranged between a TV receiver capable of receiving ordinary TV programs and a feeder line connected to an antenna input terminal of the TV receiver. Therefore, by thus arranging the apparatus according to the present invention, both of ordinary TV programs and programs of a pay TV system can be easily received at a low cost.

(2) An apparatus according to the present invention makes it possible or impossible to receive pay TV programs transmitted by using a channel unused in a certain regeon, and having the same form as ordinary TV signal without any additional information.

Accordingly, by using an apparatus according to the present invention, the whole pay TV system can be simplified at a low cost without need of specified art on the transmitting side.

(3) Further, an apparatus according to the present invention is constructed to make possible or impossible to receive such signal by depositing a coin or the like to effect or stop the oscillation of an oscillator which is provided in the apparatus and oscillates at the same frequency with the frequency of the pay TV program transmitting signal, and particularly to make it impossible by additionally mixing the pay TV program transmitting signal with oscillating output signal from the oscillator. This is, when the angular frequency of the video carrier wave of the pay-TV program transmitting signal is $\omega_C$ and the angular frequency of the oscillating output signal of the oscillator is $\omega_L$, the mixed output $F_O$ is obtained only be superposing the two, as well known.

Accordingly, the mixed output neither generates any new spectrum nor changes the video-carrier wave frequency of the pay-TV signal.

Therefore, the mixed output is allowed to be predeterminedly amplified at RF and IF stages of an ordinary TV receiver, and the pay-TV video carrier signal is AM-detected together with the output wave of the oscillator. Therefore, by selecting the relation between the amplitudes A and B as desired, stripe images of the pay-TV programs are represented on CRT. On the other hand, audio signal of the pay-TV programs is FM demodulated without any change, to emit the sound of the pay-TV programs through a speaker. The images of the pay-TV programs are in stripe patterns, but images for attracting a viewer's interest can be obtained by setting up the relation between the amplitudes A and B as desired. And, the sound of the pay-TV programs is emitted without any deformation, further to attract the interests of the receiving people. In other words, the content of the pay-TV programs is not entirely hindered from being known to the viewers even if they do not deposit a coin or the like, but images attracting the viewers' interests (though unclear) are represented and normal sound is emitted.

(4) Further, the stability of the oscillator to be fitted to the apparatus according to the present invention can be determined relative to the trap circuit as a filter circuit. Accordingly, no extremely strict stability is required, but some unstability is rather effective for changing the unclear images represented. Therefore, the trap circuit is realized with simple structure and a low cost, thereby lowering cost of the apparatus.

(5) Further, the trap circuit is provided in the apparatus according to the present invention for the purpose of not hindering another TV receiver from receiving signals and not for the purpose of rejecting and/or suppressing the pay-TV signal. Further, the trap circuit is operated by depositing a coin or the like, and short-circuited when a predetermined time of contract has passed after the depositing of a coin or the like. The said short-circuiting operation has such effects as directly feeding to the TV receiver the ordinary TV signals influencing upon both of the lower portions of the characteristic of the trap circuit (in channels adjacent to that of the said pay TV programs), not to attenuate the ordinary TV signals of the adjacent channels.

Accordingly, it is not necessary for the trap circuit to have a sharp attenuating characteristic. Further, an expensive and complicated crystal filter or notch filter is not required, either. That is, substantially no attention needs to be paid to the attenuating characteristic, as long as required amount of attenuation is achieved. Therefore, the trap circuit is obtained with simple and unexpensive elements and arrangement, to lower the cost of the apparatus.

(6) Furthermore, since the oscillating circuit is controlled by depositing a coin or the like so as to stop the oscillation for a predetermined time of contract and the system described in the item 3 above is applied, when the amount of attenuation of the filter is sufficient, many kinds of generally known disturbances caused by nonlinear elements and disturbances due to the representation of new spectrum in the heterodyne system are small enough to be neglected.

To realize the abovementioned objects, according to the present invention, there is provided an apparatus for receiving both ordinary TV programs and privately programmed TV programs comprising:

(a) an antenna for receiving ordinary TV programs transmitted from TV transmitting stations, (b) a private TV program transmitting installation comprising a transmitter for transmitting private TV programs, a means for operating and controlling said transmitter and a band-pass filter, (c) a coupling circuit for coupling signal of said ordinary TV programs receiving by said antenna and signal transmitted by said private TV program transmitting installation, (d) at least one unit connected to said coupling circuit through a bus line connected to an output terminal of said coupling circuit and at least one feeder line in continuation with said bus line, and (e) an ordinary TV receiver, an antenna input terminal of which is fed with output signal of said unit, in which said unit comprises (1) a trap circuit which is tuned in to the frequency of video carrier wave of a channel of privately programmed TV signal and which attenuates signal having component of said frequency, (2) an oscillating circuit for generating signal of sinusoidal signal of substantially the same frequency and amplitude as video carrier signal of a privately programmed channel, (3) a switch means which is operated for a limited time by depositing a coin or the like, (4) a power circuit for generating a predetermined DC voltage, (5) a filter circuit for rejecting higher harmonic signal given from said oscillating circuit, and (6) a mixer circuit which comprises a coil, a condenser and a resistor and which couples the output signal of said filter circuit and the output signal of said trap circuit.

These and other objects and advantages of the present invention will become more apparent from the following description of embodiments thereof given with reference to the appended drawings, in which.

Figure 1:
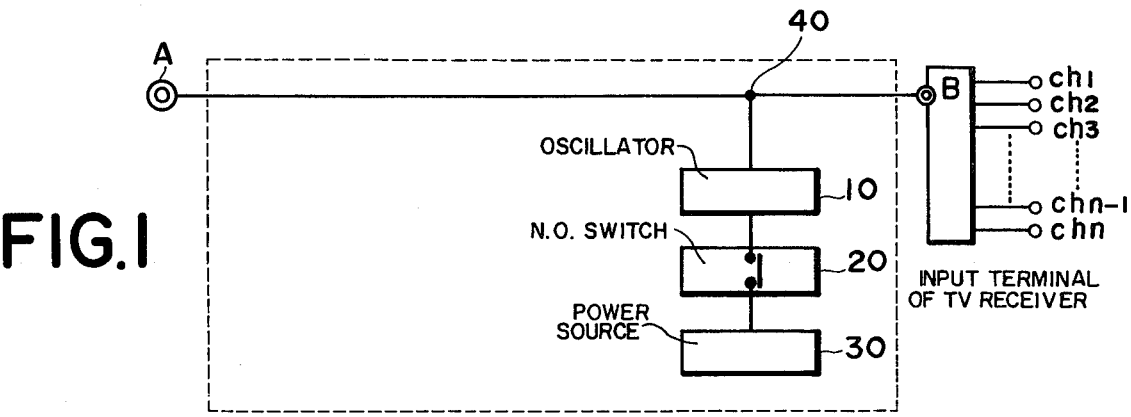
FIG. 1 is a block diagram for illustrating the principle of the present substantial invention.

Firstly, the description of the principle of the present invention is given with reference to FIG. 1.

In FIG. 1, a TV transmission signal is fed to a terminal A. A terminal B is an input terminal of an ordinary TV receiver, and branches into a plurality of channels. The terminals A and B are connected to each other by means of coaxial cable or the like.

The said terminal B is also an antenna terminal connected to an internal electronic circuit of the TV receiver. In the TV receiver, a desired channel can be selected by turning a channel set dial, needless to say. To a line connecting the terminals A and B, one end of an assembly comprising an oscillating circuit 10, a switch means 20 including a normal open contact and an electric source 30 for supplying electric power to the oscillating circuit 10 and the like arranged in series in this order are connected at a contact 40. In the TV receiver having such an additional arrangement, when the normal open contact of the switch means 20 is closed, electric power is fed from a source 30 to the oscillating circuit 10 and sine wave signal of the same frequency with the video carrier wave frequency of a desirably specified channel is generated from the circuit 10. When the video carrier signal of the specified channel, among the TV transmission signal fed to the terminal A, and the output signal from the circuit 10 are composed, the resultant video carrier signal of the TV transmission signal has a beat note. The image formed by the said composed signal on the screen of the TV receiver is flickering, unclear and thus unsuitable for viewing.

The oscillating circuit 10 is Hartley circuit, Colpitts circuit or their modification and comprises reactance element (e.g. a coil) L of crystal or a coil, capacitance element (e.g. a condenser) C, resistor R, transister Tr or vacuum tube and the like. The input signal level of the circuit 10 is substantially the same with that of the video wave signal to be composed. The switch means 20 includes a normal open contact, which may be a time contact in which a conventional magnetic relay is used, said relay being time-reset. Alternatively, the contact may be closed by operating a key.

The principle of the present invention will be now described in further detail with reference to FIG. 2.

Figure 2:
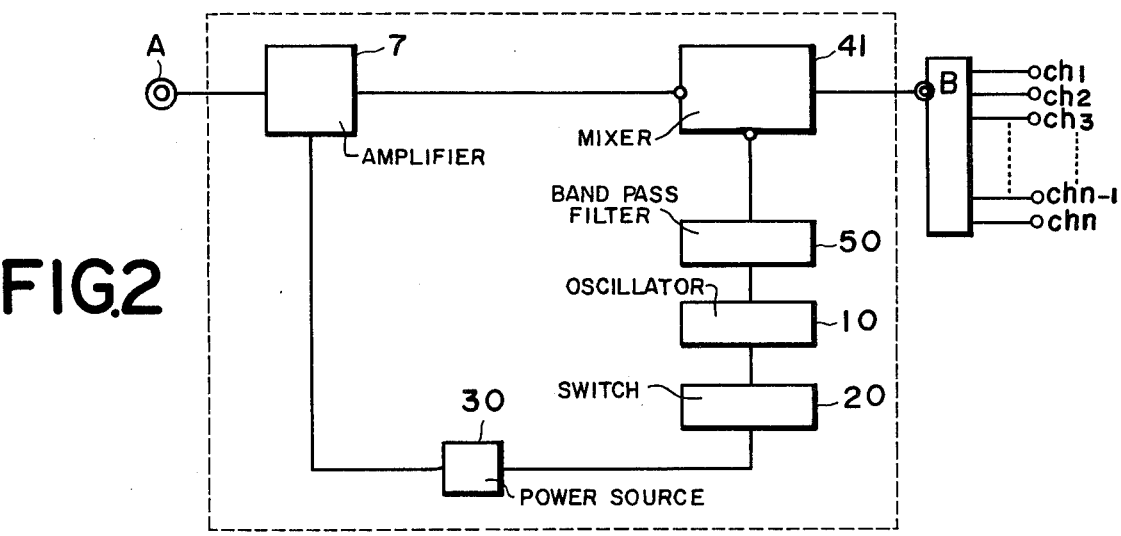
FIG. 2 is a block diagram for illustrating in more detail the principle of the present substantial invention.

In FIG. 2, an amplifying circuit 7 and a first mixer circuit 41 are inserted into the line between the terminal A and the terminal B. The said amplifying circuit 7 is directly supplied with electric power and amplifies the signal applied to the terminal A. The said first mixer circuit 41 has an additional input terminal besides one adapted to be fed with the output of the amplifying circuit 7.

The electric source 30, the switch means 20 and the oscillating circuit 10 are connected in series. Further, a band pass filter circuit 50 is connected in series to the oscillating circuit 10, the output terminal of the filter circuit 50 being connected to the other input terminal of the circuit 41. And the output terminal of the first mixer circuit 41 is connected to the terminal B.

The said filter circuit 50 is a conventional filter circuit comprising a coil L and a condenser C, and adapted to remove higher harmonic components from signal generated from the oscillating circuit 10. The first mixer circuit 41 is a Hybrit circuit comprising reactance element (e.g. a coil) L, a capacitance element (e.g. a condenser) C and a resistor R and the like and adapted to obtain a desired mixing action and increase mutual coupling loss between the said two input terminals. By the addition of the filter circuit 50, a beat note is no longer caused by the video carrier signal and the input signal of the specified channel and higher harmonic signals generated from the oscillating circuit 10. Therefore, no beat note occurs in the input signal of a channel adjacent to the specified channel, so that image produced by the adjacent channel on the screen of the TV receiver can be received as a clear and stable one without any disturbance.

By increasing mutual coupling loss between the said two input terminals of the first mixer circuit 41, the beat signal generated from the circuit 41 is entirely prevented from leaking out in the direction of the terminal A. In another TV receiver connected to the same line (common terminal A), images on a screen formed by channels other than the specified one can be viewed without any disturbance. Further, images on the screen of another ordinary TV receiver unequipped with a device according to the present invention can be desirably viewed without any disturbance.

The amplifying circuit 7 compensates the attenuation of the TV transmission signals fed to the terminal A by inserting the first mixer circuit 41 into the line between the terminals A and B. However, the amplifying circuit 7 is not necessarily required.

The present invention will now be substantially described on the basis of the principle thereof abovementioned with reference to FIGS. 1 and 2.

Figure 3:
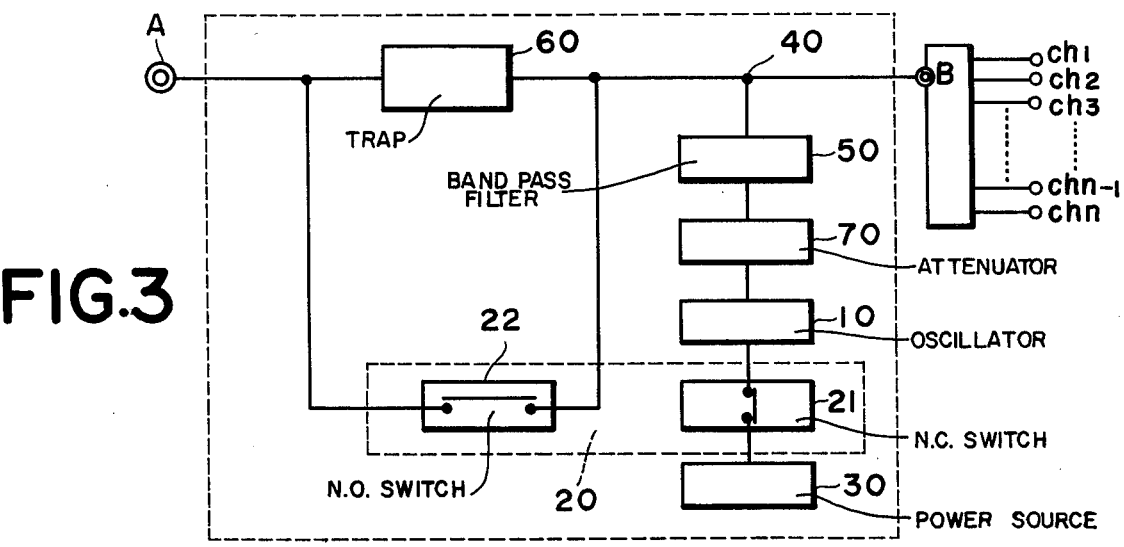
FIG. 3 is a block diagram for illustrating an embodiment shown in FIGS. 1 and 2.

FIG. 3 is a block diagram for illustrating an embodiment of the present invention, in which a trap circuit 60 is inserted into the line connecting the terminals A and B. The switch means 20 includes a normal close contact 21 and a normal open contact 22, said two contacts being adapted to operate simultaneously. The contact 22 functions, during operation, as a bypass line for the circuit 60 and passes TV transmission signal without attenuation.

Further, the electric source 30, the contact 21 of the switch means and the oscillating circuit 10 are connected in series. An attenuator 70 is connected to the output terminal of the oscillating circuit 10, while the filter circuit 50 is connected to the output terminal of the attenuator 70 each in series, the output terminal of the filter circuit 50 being connected to the contact 40 of the output side line of the trap circuit 60.

The trap circuit 60 attenuates only TV transmission signal of the specified channel among those applied to the terminal A. The circuit 60 comprises a reactance element (e.g. a coil) L, a capacitance element (e.g. a condenser) C and resistor R as well-known. The circuit 60 may be replaced by a semi-conductor element functioning as a trap circuit. The circuit is characterized in that if the specified channel is the second channel, TV transmission signals of the adjacent channels, that is, the first and the third channels are attenuated to some extent. Therefore, the said attenuation caused by the trap circuit 60 may have some effect on the adjacent channels. In this case, compensation is effected by adding parallel to the circuit 60 a band pass filter circuit (not shown) which passes signals of the first and the third channels, of course.

As well-known, the attenuator 70 is adapted to adjust the level of signal supplied by the oscillating circuit 10, and comprises reactance element (e.g. a coil) L, capacitance element (e.g. condensor) C and resistor R. In said level adjustment, among TV transmission signal which have passed through the trap circuit 60, the output level of attenuated TV transmission signal and the level of the output signal of the attenuater 70 are made substantially the same. In this case, the signal made by composing the two input signals is a beat note. If the attenuator 70 is an oscillating circuit using a transistor included in an oscillator, it may be adapted to function by regulating biased voltage potential of the transistor. The filter circuit 50 perfectly prevents the image on the TV receiver of the specified channel from being disturbed by a beat note composed of higher harmonic components, especially the harmonic wave corresponding to the frequency of the video carrier wave of the adjacent channel and the video carrier signal of said adjacent channel. Particularly, the output signal of the oscillating circuit 10 for obtaining sine wave usually includes some distortion. And the filter circuit 50 removes higher harmonic components which form the said distortion.

With this arrangement, therefore, in the abovementioned other TV receiver connected to the same line, a beat note can be prevented from leaking not only into a TV receiver to be fed with TV transmission signal of other channels than the specified one, but also into the input line for TV transmission signal of a TV receiver not provided with an apparatus according to the present invention.

Figure 4:
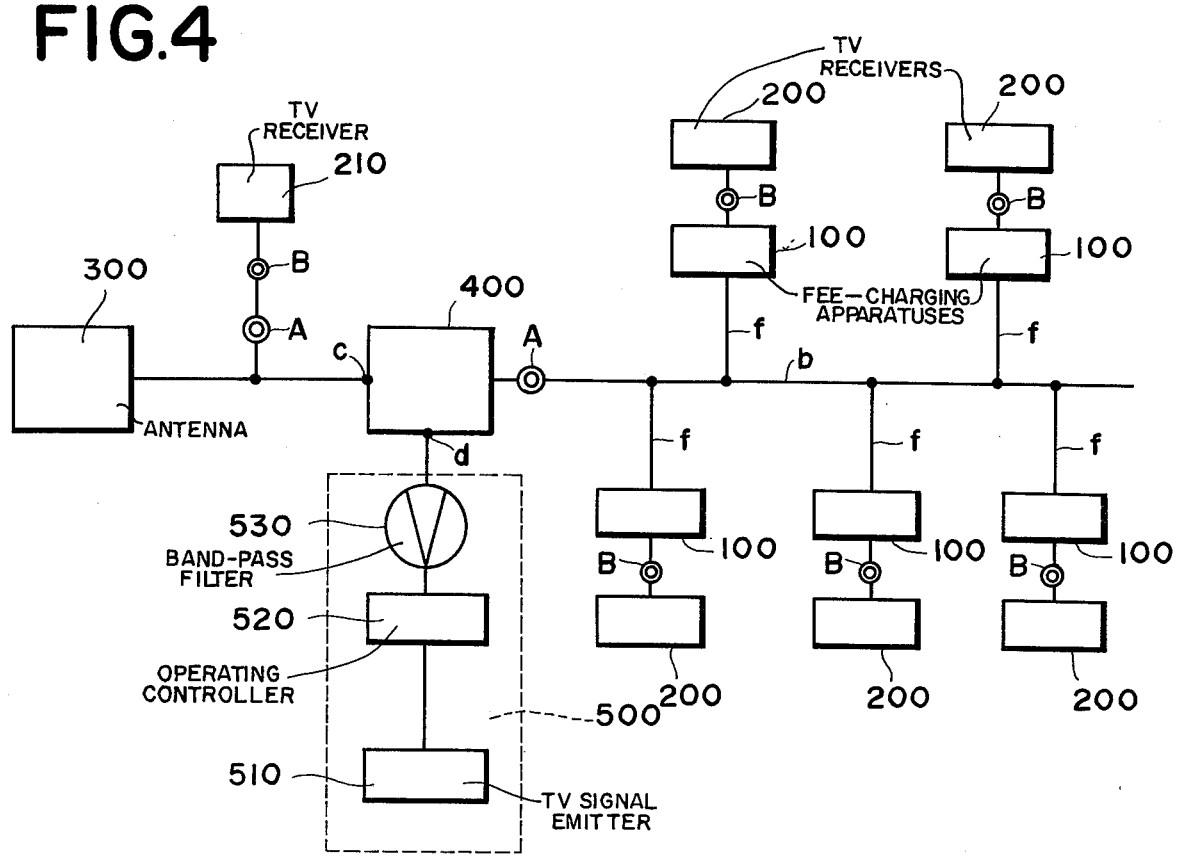
FIG. 4 is a block diagram for an example of application of an apparatus according to the present substantial invention.
Figure 5:
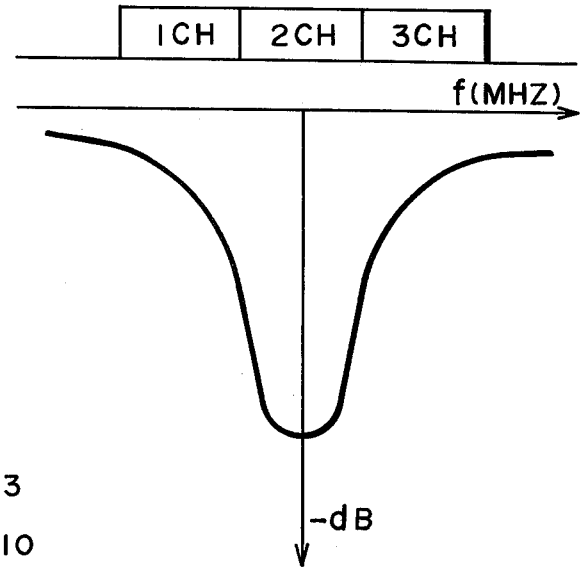
FIG. 5 is an operation characteristic curb in a trap circuit of an apparatus according to the present substantial invention.

In FIG. 4 shown is a block diagram for an example of application of the present invention. The line connecting the terminals A and B to each other comprises a busline b and a feeder line f by which a plurality of TV receivers 200 are connected to the busline b. The terminals A and B of each TV receiver 200 are individually connected to each other through the apparatus (hereinafter referred to as the unit 100) according to the present invention described with reference to FIG. 3. Further, an antenna line 300 adapted to receive TV transmission signal transmitted from a transmitting station and the output signal line from the privately programmed TV transmission signal generating means 500 are connected to each other at the second mixing circuit 400. And the output terminal of the said second mixing circuit 400 are connected to the abovementioned terminal A.

The said means 500 comprises, for example, a privately programmed TV signal emitter 510 adapted to transmit privately programmed video and/or audio signal by means of a VTR or a private TV camera, an operation control apparatus 520 for said emitter 510 and a band pass filter circuit 530 for passing only said signal therethrough.

The video carrier frequency of the output signal of the said means 500 is selected as the frequency of the specified channel of the TV receiver. Normally, the said frequency is selected to be the frequency of the carrier signal of a channel which does not include TV transmission signal fed to the antenna line 300, that is, an idle channel. In this case, the frequencies and the frequency characteristics of the oscillating circuit 10, the filter circuit 50, the trap circuit 60 and the attenuator 70 all included in the unit 100 are adjusted in relation to the frequency of video carrier signals of optionally specified channel. Further, the contact of the switch means 20 may be adapted to be operated by depositing of a coin or a circular metal or other equivalent thereof, or by a key-switch means. In the latter case, operation of the contact by means of the key is made a fee-charging operation.

In the TV receiver 210 connected to the line connecting the second mixer circuit 400 and the antenna 300, the interconnection loss between the two input terminals of the circuit 400 is made large similarly in the first mixer circuit, so that privately programmed TV transmission signal are not fed from the means 500 to the receiver. Further, in the TV receiver 210, image on the screen fed by video signal from the antenna 300 is not subjected to any disturbance.

Figure 6:
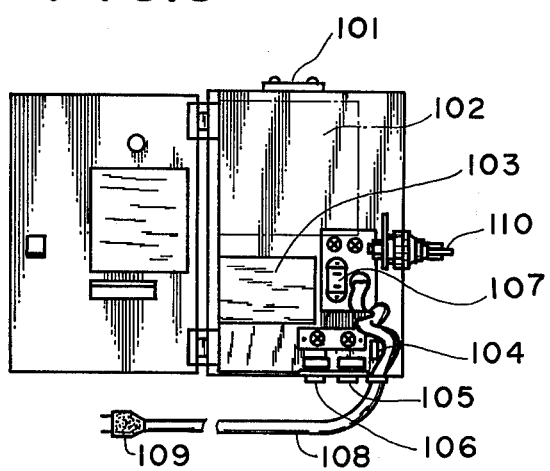
FIG. 6 is a view for illustrating the construction of a unified embodiment of an apparatus according to the present substantial invention.

The construction of the unit 100 of a unified apparatus according to the present invention is shown in FIG. 6. In this unit 100, the switch means 20 is actuated by depositing a coin or the equivalent circular metal into a slot 101. The electromagnetic relay which is, for example, a time-limit relay, and which is a normal open contact and/or normal close contact of the switch means 20 contained in a box 102 is actuated, for example, by means of a microswitch on depositing the coin or the like into the slot 101. The coin or the like deposited into are contained in a coin receiver 103. The oscillating circuit, the band pass filter, trap circuit and/or the first mixer circuit and the like are contained in the box 104 and adapted to operate as abovementioned. A terminal 105 corresponding to the said terminal A is connected through a coaxial cable to the bus line b, while a terminal 106 is connected through a coaxial cable to the terminal B which is the antenna terminal of the TV receiver. Impedance of the said two terminals and the coaxial cables are matched in a conventional manner. A receptacle 107 for a plug (not shown) of a wire connected to the electric source circuit of the TV receiver is connected in parallel to a cord 108 connected to the electric source circuit of the unit. A plug 109 connected to the cord 108 is adapted to be inserted into a receptacle (not shown) connected to a commercial feed line.

One terminal of the cord 108 is connected to a conventional voltage adjusting circuit comprising a Zener diode, a resistor R, a condenser and others and constituting an electric source circuit, the output terminal of said circuit being connected to the normal open contact of the said switch means. The said voltage adjusting circuit is also contained in the box 104. Numeral 110 designates a key for locking the box of the unit.

As abovementioned, the unit 100 constituting an electronic circuit separate from the internal electric circuit of a normal TV receiver can be operated merely by connecting the same through a coaxial cable to the TV receiver and connecting the same to the electric source feed line.

The description above is an example of application of an apparatus according to the present invention. And the present invention is not limited thereto, of course.

Figure 7:
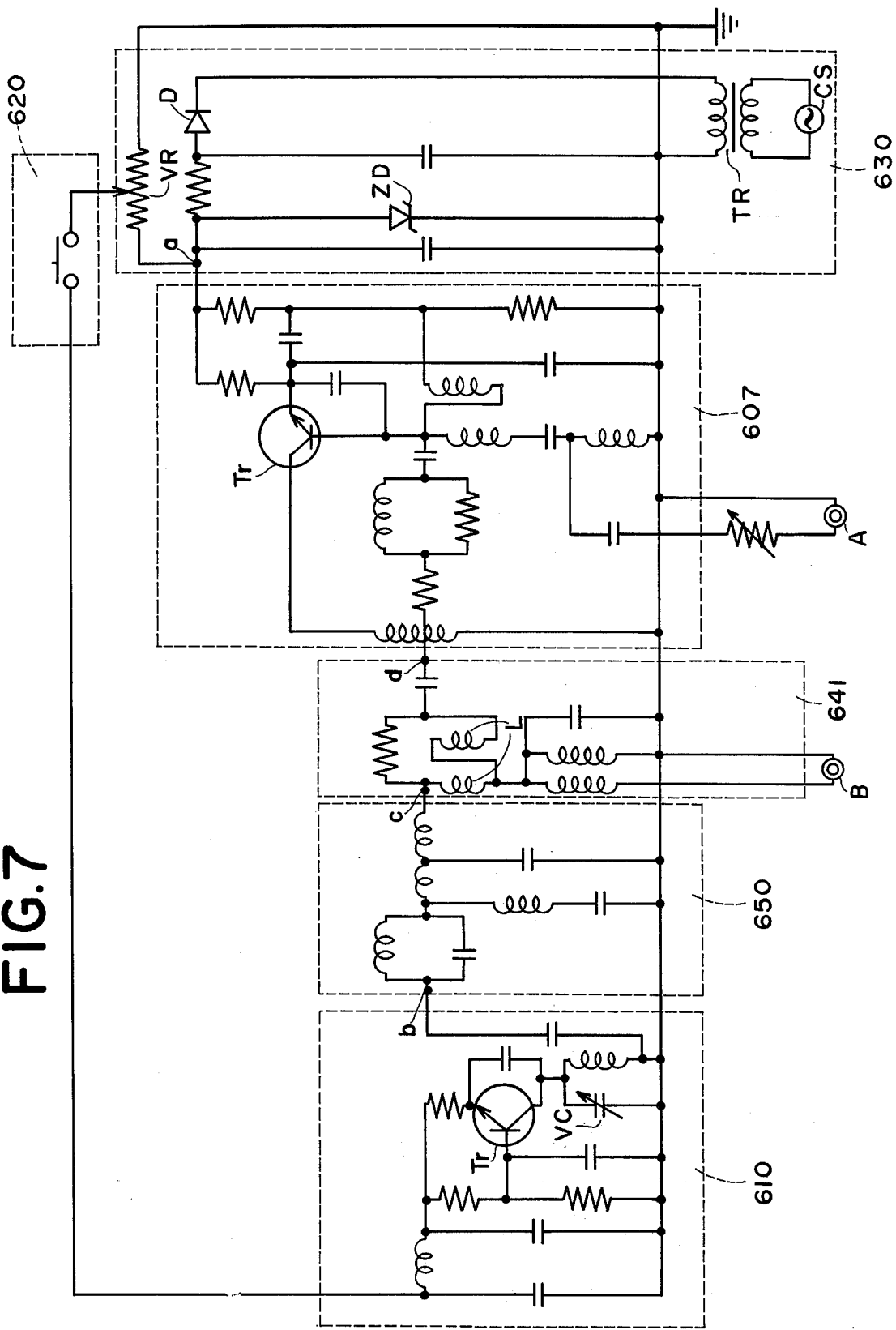
FIG. 7 is a diagram of an example of a number of electronic circuits used in an apparatus according to the present substantial invention.

In FIG. 7 shown is an example of an electronic circuit for an apparatus according to the present invention. This circuit has the following construction. This circuit is provided with an oscillating circuit 610 for generating sine wave signal of substantially the same frequency with the frequency of the video carrier signal of the specified channel. The circuit 610 is adapted to vary the frequency of the said sine wave signal by means of a variable condenser VC. An electric source circuit 630 is adapted to supply direct voltage to the oscillating circuit 610 through a switch means 620 including the normal close contact 21 operated by depositing of a coin or by key-switching. Voltage of a commercial electric source CS is converted to that of a desired value at a transformer TR provided in the circuit 630. Further, the construction is such that output at the nodal point a in the circuit 630 including a diode Dl and a Zener diode dZ is a desired constant voltage signals. The variable resistor VR makes variable the output signal level of the oscillating circuit 610. TV transmission signals are fed to the terminal A and amplified as desired at an amplifying circuit 607. The output signal of the oscillating circuit 610 is supplied to the input terminal b of a filter circuit 650, while that of said filter circuit 650 is supplied to the input terminal c of the first mixer circuit. The other input terminal d is supplied with the output signal of the said circuit 607. By means of a coil L of the circuit 641, the signal supplied to the said two input terminals c, d are mixed. The output signal from the circuit 641 is led to the terminal B which is the antenna terminal of the TV receiver. The signal from the said terminal B is the video carrier signal of the specified channel a being a beat note. The abovementioned electronic circuit is set in a chassis (not shown), said chassis being adapted to screen the radiation of electromagnetic waves from the inside and/or the absorption of the same from the outside, of course.

The abovementioned electronic circuit is a circuit for an embodiment of the present invention, and the present invention is not limited thereto.

What is claimed is:

1. Apparatus for use with a plurality of television receivers, each adapted to receive first television signals from non-fee-charged stations and display images in response thereto on their respective first set of channels, said first signals being received at a common antenna and each receiver having an antenna input terminal, said apparatus comprising:

privately programmed transmitter means for generating second television signals from a fee-charged station having an audio portion and a video carrier signal different from the carrier signals associated with said first set of channels;

coupling circuit means receiving said first and second television signals and for combining said signals and for coupling said combined signals to a common terminal; and a fee-charging unit for each receiver connected between coupling means and said antenna input terminal of an associated receiver, each unit comprising:

trap circuit means receiving said combined signals from said common terminal for blocking transmission of the carrier signal of said second television signals;

an oscillator circuit for generating a sinusoidal local carrier signal of substantially the same frequency and amplitude as the video carrier signal of said second television signals;

band pass filter circuit means receiving the output of said oscillator circuit for rejecting harmonic signals of said local carrier signal;

switch means selectively actuatable for a predetermined time in circuit with said oscillator for inhibiting said oscillator from generating said local carrier signal when actuated; and for deactivating said trap circuit means when actuated to thereby permit passage of said second television signals; and a mixer circuit receiving the output signals of said trap circuit and said filter circuit means for coupling said signals to said antenna input terminal of the associated receiver;

whereby each receiver normally receives said first television signals without interference and normally receives the audio portion and mixed carrier signals of said television signals and said local carrier signal except when said switch means is actuated during which predetermined time, said oscillator circuit is inhibited from generating said local carrier signal.

2. The apparatus of claim 1 wherein said coupling circuit means includes a common bus line connected to said common terminal and a feeder line for connecting said bus line to each receiver.

3. The apparatus of claim 2 wherein said trap circuit of each unit is connected to an associated feeder line.

4. The apparatus of claim 2 wherein said switch means includes a normally open switch in parallel with said trap circuit whereby when said switch is actuated, said second television signals are passed to the associated receiver without attenuation.

5. The apparatus of claim 4 wherein each unit further comprises a power source and said switch means includes a normally closed switch coupling said oscillator circuit to said power source.

6. The apparatus of claim 5 wherein each unit comprises an integrally formed housing providing an opening for a coin or the like, an input terminal, an output terminal, a cord with a plug for feeding electric power from a line source, and a key for locking said housing.

7. The apparatus of claim 5 wherein said switch means comprises a time delay relay and a microswitch operated thereby.

* * * * *